US012465265B2

(12) United States Patent
Kalinin

(10) Patent No.: US 12,465,265 B2
(45) Date of Patent: Nov. 11, 2025

(54) METHOD FOR AUTOMATED DETECTION OF SITES OF LATEST ELECTRICAL ACTIVATION OF THE HUMAN HEART AND A CORRESPONDING SYSTEM

(71) Applicant: EP SOLUTIONS SA, Yverdon-les-Bains (CH)

(72) Inventor: Vitaly Kalinin, Yverdon-les-Bains (CH)

(73) Assignee: EP SOLUTIONS SA, Yverdon-les-Bains (CH)

( * ) Notice: Subject to any disclaimer, the term of this patent is extended or adjusted under 35 U.S.C. 154(b) by 55 days.

(21) Appl. No.: 18/480,568

(22) Filed: Oct. 4, 2023

(65) Prior Publication Data

US 2024/0130658 A1   Apr. 25, 2024

(30) Foreign Application Priority Data

Oct. 7, 2022   (EP) .................................... 22200250

(51) Int. Cl.
| | |
|---|---|
| *A61B 5/343* | (2021.01) |
| *A61B 5/00* | (2006.01) |
| *A61B 5/055* | (2006.01) |
| *A61B 5/353* | (2021.01) |
| *A61B 5/36* | (2021.01) |
| *A61B 6/00* | (2006.01) |
| *A61B 6/50* | (2024.01) |

(52) U.S. Cl.
CPC ............ *A61B 5/343* (2021.01); *A61B 5/0044* (2013.01); *A61B 5/055* (2013.01); *A61B 5/353* (2021.01); *A61B 5/36* (2021.01); *A61B 6/503* (2013.01); *A61B 6/5247* (2013.01)

(58) Field of Classification Search
CPC ....... A61B 5/343; A61B 5/0044; A61B 5/055; A61B 5/353; A61B 5/36; A61B 6/503; A61B 6/5247; A61B 5/256; A61B 5/282; A61B 5/287; A61B 5/346; A61B 5/367
See application file for complete search history.

(56) References Cited

U.S. PATENT DOCUMENTS

| | | | |
|---|---|---|---|
| 5,891,045 A | 4/1999 | Albrecht et al. | |
| 2003/0236466 A1* | 12/2003 | Tarjan ..................... | A61B 5/28 600/508 |

(Continued)

OTHER PUBLICATIONS

European Search Report and Written Opinion in EP Application No. 22200250.3-1113 mailed Mar. 29, 2023 (10 pages).

(Continued)

*Primary Examiner* — Baisakhi Roy
(74) *Attorney, Agent, or Firm* — Leason Ellis LLP

(57) ABSTRACT

A method for the automated detection of sites of latest electrical activation of the human heart, envisages: constructing a number of isopotential maps associated with the electrical potential distribution on the surface of the heart in respective times within a processing period occurring near the end of the ventricular or atrial depolarization; processing the isopotential maps to identify regions of maximal positive electrical potential; determining the barycenters of the identified regions; and localizing the site of latest heart electrical activation based on, in particular as an average of, the determined barycenters.

16 Claims, 6 Drawing Sheets

(56) References Cited

U.S. PATENT DOCUMENTS

| | | | |
|---|---|---|---|
| 2007/0191895 A1* | 8/2007 | Foreman | A61N 1/36114 607/14 |
| 2007/0299353 A1* | 12/2007 | Harlev | A61B 5/287 600/509 |
| 2010/0268059 A1* | 10/2010 | Ryu | A61N 1/3627 600/407 |
| 2011/0275921 A1 | 11/2011 | Revishvili et al. | |
| 2014/0336520 A1 | 11/2014 | Zeng et al. | |
| 2015/0042646 A1* | 2/2015 | Comaniciu | G06T 7/12 345/420 |
| 2016/0210435 A1* | 7/2016 | Neumann | G09B 23/288 |
| 2016/0283687 A1* | 9/2016 | Kamen | G06T 19/00 |
| 2016/0338611 A1 | 11/2016 | Kalinin et al. | |
| 2017/0185740 A1* | 6/2017 | Seegerer | G09B 23/288 |
| 2018/0289276 A1* | 10/2018 | Relan | A61B 5/283 |
| 2020/0132665 A1* | 4/2020 | Amuzescu | G01N 33/5008 |
| 2021/0272297 A1* | 9/2021 | Chen | G06T 7/33 |

OTHER PUBLICATIONS

Lian J et al: "Body surface Laplacian mapping of atrial depolarization in healthy human subjects", .Medical & Biological Engineering & Computing, Springer, Berlin, DE, vol. 4 0, No. 6, Nov. 1, 2002 (Nov. 1, 2002), pp. 650-659, XP019834348, ISSN: 1741-0444 * the whole document *.

Medvegy Mihaly et al: "Body Surface Potential Mapping: Historical Background, Present Possibilities, Diagnostic Challenges", Annals of Noninvasive Electrocardiology, vol. 7, No. 2, Apr. 1, 2002 (Apr. 1, 2002), pp. 139-151, XP093032171, us ISSN: 1082-720X, DOI: 10.1111/j.1542-474X.2002.tb00155.x * the whole document *.

* cited by examiner

● Points of impact   ○ Mean point of impact

METHOD FOR AUTOMATED DETECTION OF SITES OF LATEST ELECTRICAL ACTIVATION OF THE HUMAN HEART AND A CORRESPONDING SYSTEM

CROSS-REFERENCE TO RELATED APPLICATIONS

This patent application claims priority from European patent application no. 22200250.3 filed on Oct. 7, 2022, the entire disclosure of which is incorporated herein by reference.

TECHNICAL FIELD

The present invention relates to a method for automated detection of sites of latest electrical activation of the human heart and to a corresponding system.

BACKGROUND ART

Localization of sites or zones of latest cardiac electrical activity represents a significant electrophysiological information for the characterization of the patterns of electrical activation of the heart ventricle or atria. This information, in particular, is valuable for assisting the optimal installation of stimulating electrodes of implanted devices for cardiac resynchronization therapy (CRT), widely used for the treatment of patients with heart failure.

As it is known, synchronicity of left and right ventricular contractions is disrupted in such patients, leading to deterioration of the pumping function of the heart and progression of heart failures. Cardiac resynchronization therapy (CRT) is a conventional method to correct this disorder, consisting in implanting a cardiac resynchronizing device that performs electrical stimulation of the right and left ventricles, which allows to restore the synchronicity of contractions.

A number of studies has shown that the effects of this cardiac resynchronization therapy are improved when a left-ventricle pacing lead of the cardiac resynchronizing device is positioned at the most delayed myocardial segment avoiding myocardial scar. Thus, detection of the latest electrical activation zone of heart activity can be used as a guide for the optimal installation of the cardiac resynchronization electrode, which can help to improve the response to the cardiac resynchronization therapy.

A conventional method for detection of latest activation zones (LAZ) using invasive or non-invasive cardiac mapping is based on determination of local activation times (LAT) by local electrograms and visual representation of the electrical activation sequence of the cardiac chambers in the form of isochronal and "propagation" maps on 3D geometrical models of the heart.

Either unipolar or bipolar local electrograms can be used to determine the local activation times.

In the case of unipolar electrograms, local activation time detection is based on identification of the "down-stroke" of the signal. The "down-stroke" is defined as the maximal negative slope of the unipolar electrogram, i.e., as the time at which the time derivative of the signal reaches a minimum value during the depolarization period. In case of bipolar electrograms, local activation time is defined based on the positive or negative peak of the signal during the depolarization period.

A number of slightly different methods for determining electrical activation times from local electrograms have also been proposed, among which those based on the onset of bipolar electrograms, the maximal negative slope of unipolar electrograms within a predefined bipolar window or the maximum of the surface Laplacian of the isopotential map.

Unfortunately, the conventional methods have low accuracy and spatial resolution when applied to processing of local electrograms reconstructed computationally by body surface mapping as a solution to the inverse electrocardiography problem.

This problem is an ill-posed problem: small errors of the problem conditions can lead to arbitrarily large errors of the problem solutions. To obtain a stable approximation of the solution, it is required to use special regularization algorithms Unfortunately, the regularization algorithms tend to smooth out the problem solution. Therefore, the reconstructed maps of the electrical potential on the surface of the heart have a smoothed activation front, and local unipolar electrograms have a smoothed and often shifted "down-stroke".

Because of this effect, activation mapping methods based on the detection of "down-stroke" (or similar characteristics) of local electrograms have an intrinsically low precision.

DISCLOSURE OF INVENTION

It is an object of the present solution to provide a method and a corresponding system, allowing to solve at least partly the above-mentioned inconveniences of known solutions.

According to the present solution, a method for automated detection of sites of latest electrical activation of the human heart and a corresponding system are therefore provided, according to the appended claims.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1A:
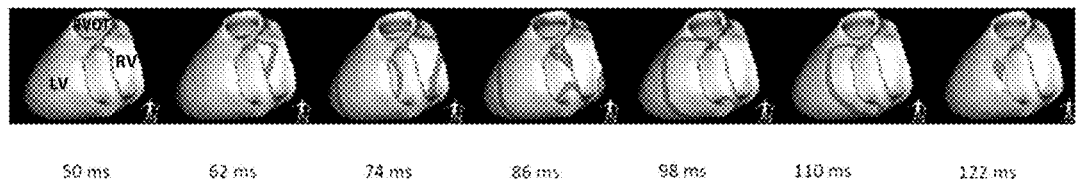
FIGS. 1A and 1B show a sequence of excitation of the ventricles in the form of activation fronts and, respectively, isopotential maps in activation by electrical pacing in the apex of the right ventricle.

As will be discussed in more details in the following, one aspect of the present solution envisages detection of sites of latest cardiac electrical activation based on isopotential maps of the electrical potential of the heart.

Isopotential maps are a visualization of the distribution of electrical potential values on the surface of the heart at each moment of the cardiocycle. These maps can be created by invasive electroanatomical mapping of the heart using intracardiac catheters, or, in a preferred embodiment, by non-invasive cardiac mapping, which consists of numerical reconstruction of local cardiac electrical activity using body surface electrical mapping.

The proposed solution is based on the biophysical regularity of cardiac electrical activity, according to which at the end of the period of depolarization of the atria or ventricles, the maximum positive electrical potential is observed in the areas of latest electrical activation.

The proposed solution thus consists of processing of isopotential maps constructed in a period of time occurring near the end of the ventricular/atrial depolarization. In particular, the processing comprises isolation of domains of maximal positive electrical potential bounded by a closed line or contour (isoline) and calculation of the central points (i.e. the barycenters) of these domains. The central points thus determined then lead to identification of the site of latest heart electrical activation.

In particular, the latest activation points may be detected on the epicardial or endocardial surface of the ventricles or atria.

The proposed solution is based on the fact that the electrical potential is positive and reaches a maximum in those areas of the myocardium in which the activation front converges. These zones of positive potential, if occurring at the end of the depolarization period, are the areas of heart latest electrical activation. Thus, it is possible to define the zones of latest activation as the zones of maximal positive potential occurring at the end of the ventricular/atrial depolarization period.

In particular, it is known that local electrograms have a low amplitude in the last milliseconds of the depolarization period. On the contrary, the intensity of electrocardiographic noise does not depend on the phase of the cardiac cycle. Therefore, the signal-to-noise ratio at the end of the ventricular/atrial excitation period may be large and negatively affect the detection of the latest activation zone.

In this regard, according to an aspect of the present solution, the very end of the depolarization period is not used for recognition of the latest activation zone, but instead a period is used near the end of the duration of the same depolarization period, during which the electrogram amplitude (and signal-to-noise ratio) is still quite large; in particular, the period from 80% to 90% of the duration of the depolarization period is used as a processing period.

Moreover, in order to increase the accuracy of the localization, not a single one, but a certain number of isopotential maps are considered in the above processing period. The central points of the corresponding zones of maximal positive electrical potential are calculated for each of the isopotential maps and the resulting latest activation point is computed as an average position of the central points thus determined.

Figure 1B:

FIGS. 1A and 1B show a sequential series of myocardial (in particular, ventricular) activation fronts and, respectively, the corresponding isopotential maps of the electrical potential of the ventricles of the heart during electrical stimulation from the apex of the right ventricle (the images are obtained by computer-simulation modelling).

These series of images (taken at respective consecutive times, e.g. in time increments of at least one millisecond) show the emergence of a zone of maximal positive potential coinciding with the zone of latest activation, which is located, in this example, in the basal part of the lateral wall of the left ventricle.

The above-discussed patterns of electrical (extracellular) potential can be qualitatively explained using a simplified model of the sources of the electric field of the heart in the form of a double electric layer, as discussed e.g., in Barr, R. C., Van Oosterom, A., 2010, Genesis of the Electrocardiogram, In: Macfarlane, P. W., Van Oosterom, A., Pahlm, O., Kligfield, P., Janse, M., Camm, J. (eds) Comprehensive Electrocardiology. Springer, London.

This simplified model follows from the bidomain model under assumptions that electrical conductivities of the myocardium extracellular and intracellular media and of the extracardiac human body media (respectively denoted as $\sigma_e$, $\sigma_i$, $\sigma_b$) are scalar positive constant coefficients, satisfying the condition: $\sigma_b = \sigma_e + \sigma_i$. At a rest state, the myocardium has a constant transmembrane potential value ($v_R \approx -80$ mV). In addition, it is assumed that the myocardium in the process of depolarization (in the plateau phase) has a constant transmembrane potential value ($v_D \approx -30$ mV).

According to this model, at each moment, the potential of the electric field of the heart is generated by a double electric layer on the surface of excited regions of the myocardium, where the external side of the double layer is negative, and the internal side is positive.

The double layer density v is equal to a constant value:

$$v = \frac{1}{4\pi} \cdot \frac{\sigma_i}{\sigma_i + \sigma_e} (v_D - v_R).$$

where $v_D$ and $v_R$ are the above defined transmembrane potential values.

This implies that the electric potential u at any point A outside the myocardial domain is proportional to the difference between the measures of solid angles $\alpha^+$ and $\alpha^-$ at which the positive and negative sides of the double layer are visible from the same point A, according to the expression: $u(A) = v \cdot (mes(\varphi^+) - mes(\varphi^-))$, where mes denotes a solid angle measure.

Figure 2:
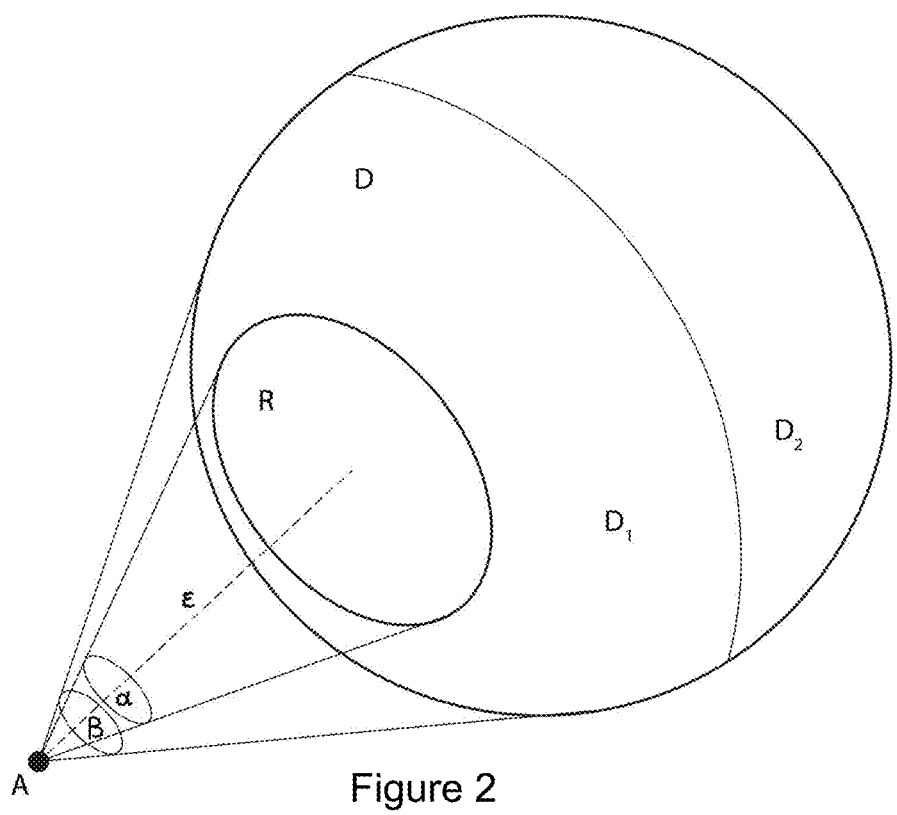
FIG. 2 is a schematic representation of the electric field potential of the heart at the end of the depolarization period, based on a simplified model of electric field sources in the form of the electrical double layer.

Reference is now made to FIG. 2, which is a schematic representation of the final period of depolarization, when most of the myocardium (region D) is in an activated state, and a small area (region R) of the myocardium still remains at rest (in the above FIG. 2, without loss of generality, the heart chamber is represented as a sphere).

A point A is located outside the myocardium domain at a small distance E from the myocardial surface, such that its projection A o on the same myocardial surface is in the center of region R.

Region R is visible at a solid angle $\alpha$. The region D of the depolarized myocardium can be divided into two parts: $D_1$ and $D_2$, where the first part $D_1$ is located on a hemisphere closest to point A. Only the external negatively charged side of the surface is visible from point A. The hemisphere is visible at a solid angle $\beta = 2\pi$, thus region $D_1$ is visible at a solid angle ($\varphi^- = 2\pi - \alpha$. The second part $D_2$ is a hemisphere remote from point A. Only the internal positively charged side of its surface is visible from point A at the solid angle $\varphi^+ = 2\pi$.

Therefore, the electrical potential in point A can be expressed as:

$$u(A) = v \cdot (mes(\varphi^+) - mes(\varphi^-)) = v \cdot (2\pi - (2\pi - mes(\alpha))) = v \cdot mes(\alpha).$$

where v is always positive, thus u(A) is positive and it is proportional to $mes(\alpha)$.

Electrical potential u(A) is indeed maximal if the projection of point A is in the centre of region R (which thus represents the latest electrical activation region).

The electrical potential of the double layer has a jump on the surface of the myocardium with a limit value $u(A_0)$:

$$u(A_0) = \lim_{A \to A_0} u(A)$$

when approaching the myocardial domain boundary from the outside; this is the value that is measured when mapping the heart.

More precisely, under some assumptions about the electrical potential u in the extracardiac domain $\Omega$ and the double layer density v on the cardiac surface $\Gamma$ as well as about the smoothness class of boundary $\Gamma$ (for instance, $u \in H^1(\Omega)$, $v \in H^{1/2}(\Gamma)$, $\Gamma$ is the Lipshitz surface) almost everywhere $$u(A_0) = 2\pi v + v \left( p.v. \int_R \frac{\partial}{\partial n} \left( \frac{1}{|A_0 - B|} \right) ds_B \right), A_0, B \in \Gamma,$$

where $A_0$ is a given point on the cardiac surface $\Gamma$, B is a variable point on the cardiac surface $\Gamma$, R is the region of the cardiac surface at rest, $ds_B$ is the differential element of the surface area, $\partial/\partial n$ denotes the outward normal derivative and the integral is understood in the sense of the Cauchy principal value (p. v.).

Because of the fact that the potential u is continuous in the body domain and the distance $\varepsilon$ to the cardiac surface can be chosen arbitrarily small, the obtained estimation for electrical potential u(A) are valid for potential $u(A_0)$ on the cardiac surface.

Figure 3:
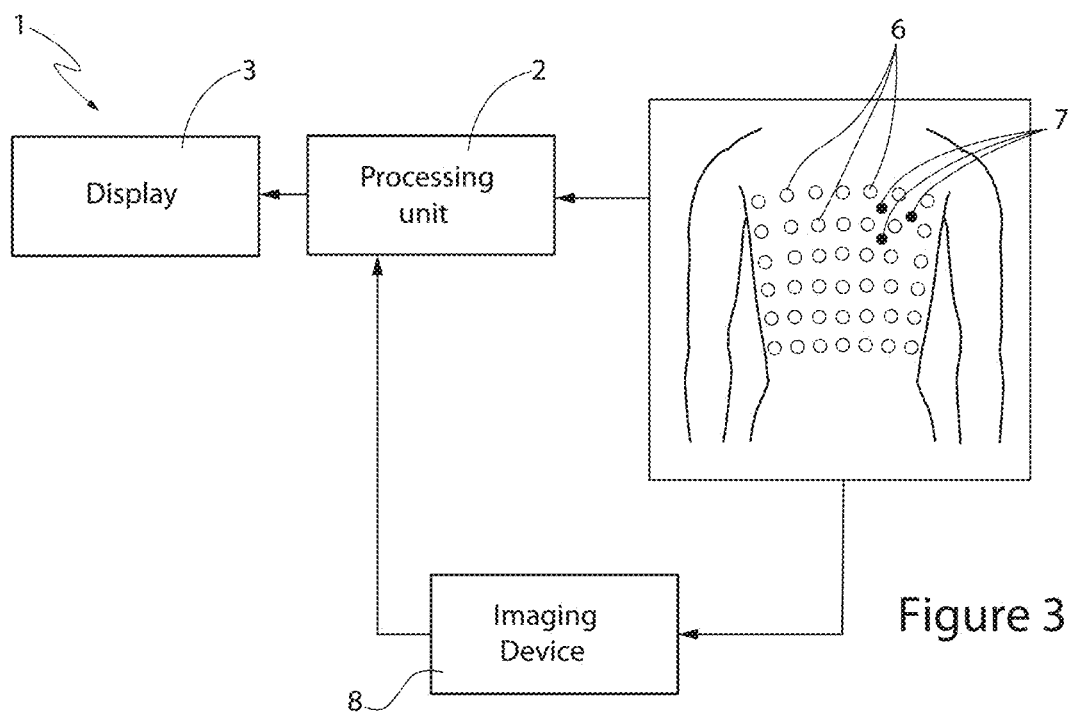
FIG. 3 is a schematic representation of a system for automated detection of sites of latest electrical activation of the human heart, according to a possible embodiment.

Referring now to FIG. 3, a detailed description of a preferred embodiment of the present solution is discussed, according to which isopotential maps of the cardiac electrical activity are provided by non-invasive cardiac mapping.

A system for automated detection of sites of latest cardiac electrical activation, denoted in general with 1, comprises a processing unit 2, e.g., including a microprocessor, a microcontroller or any suitable computing unit, which may be provided for example in a personal computer (PC) of a desktop or laptop type.

The processing unit 2 is coupled to a display or monitor 3 and is configured to implement a dedicated (software) algorithm to localize the sites of latest cardiac electrical activation and to output resulting localization information on the display or monitor 3.

In particular, the processing unit 2 is configured to receive at its input: electrograms (signals or electric potentials) measured at a representative set of points on the surface of the torso of the patient with multiple body surface electrodes (e.g. more than 64), which are shown schematically and denoted with 6 in the above FIG. 3;

ECG (Electrocardiogram) signals acquired from standard ECG leads placed on the torso of the patient, shown schematically and denoted with 7;

heart and/or torso geometry coordinates of the patient's body obtained e.g. by means of an imaging device, shown schematically and denoted with 8, for example a CT—Computer Tomography—or MRI—Magnetic Resonance Imaging—device.

Figure 4:
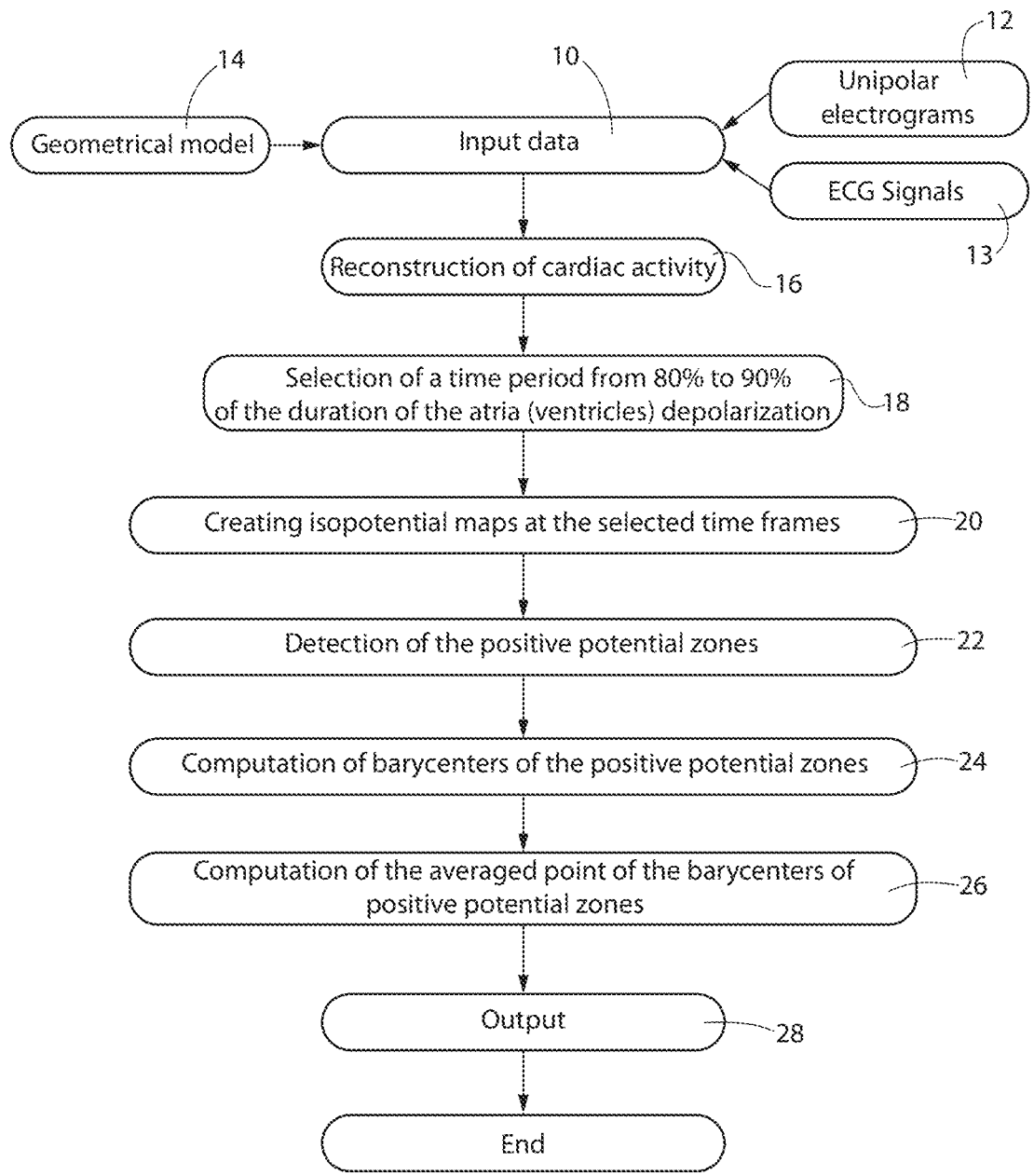
FIG. 4 is a schematic flow chart of operations performed by the system of FIG. 3.

Operation of the processing unit 2 is now discussed in more details and with reference to the flow chart diagram of FIG. 4.

In a first step 10, input data are collected from a patient, including:
- the electrograms, in particular unipolar electrograms, measured on the surface of the torso of the patient, as shown at step 12;
- the ECG signals, as shown at step 13; and
- the heart and/or torso geometry coordinates of the patient's body and corresponding three dimensional (3D) geometrical model of the heart (atria and/or ventricles) and/or the torso of the patient with identification of the body surface electrodes 6, as shown at step 14.

The above geometrical model may be computed by the same processing unit 2 based on the received anatomical information.

The solution then envisages, as shown at step 16, the numerical reconstruction of the cardiac electrical activity and in particular of the potential of the electric field on the surface of the heart, starting from the values of the electric potential measured at the representative set of points on the surface of the torso, in combination with the geometrical model of the heart and/or torso of the patient.

This computational reconstruction is based on a numerical solution of the inverse electrocardiography problem in terms of potentials, as discussed in details e.g. in U.S. Pat. No. 8,660,639 B1 in the name of the present Applicant.

Non-invasive cardiac mapping envisages the numerical solution of the inverse electrocardiography problem, through construction of the (typically poor-conditioned) transfer matrix approximating the operator of the problem (by the boundary elements, final elements, fundamental solutions or other methods) and obtaining electrical potential values in a set of points on the cardiac surface by numerical solving the system of linear algebraic equation using the regularization algorithms (proposed for approximate but error-resistant solutions of ill-conditioned linear algebraic systems).

As shown at step 18, the method then envisages selection of the required processing period of time, e.g. from 80% to 90% of the duration of the atrial or ventricle depolarization, using the ECG signals acquired from the standard ECG leads 7, for example relating to ventricular activation.

Figure 5:
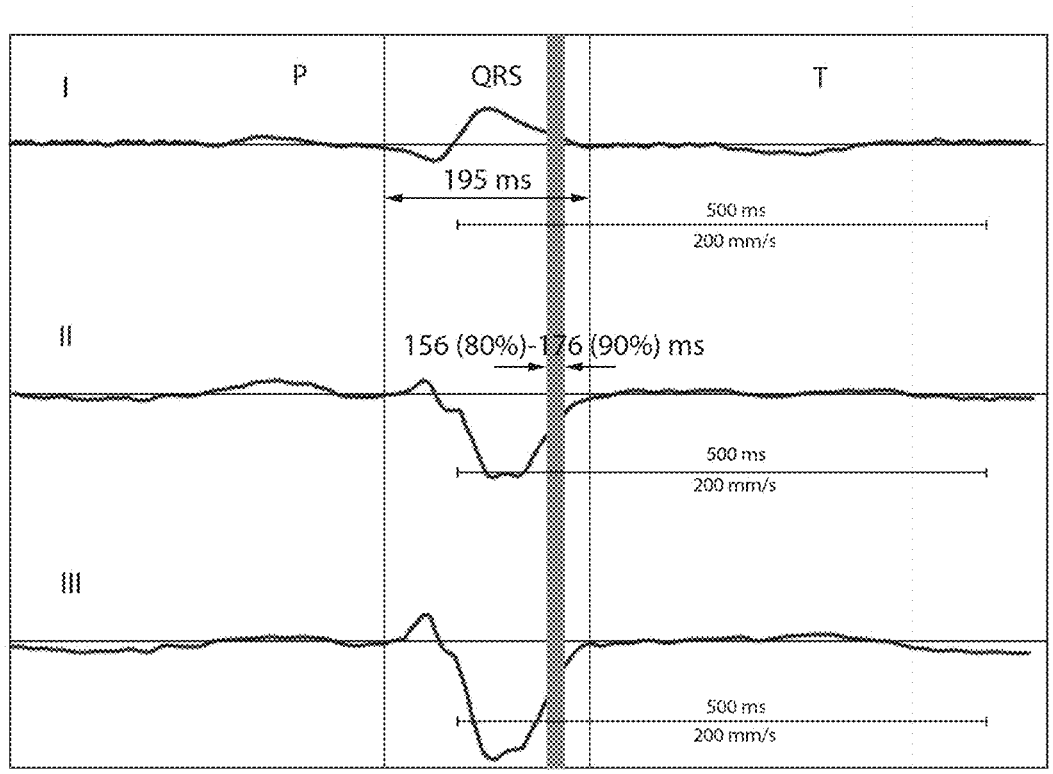
FIG. 5 shows the pattern of ECG signals, with highlighted the depolarization period relating to ventricle electrical activity.

According to a possible embodiment and referring to FIG. 5, this procedure includes: determination of the beginning and end of the ventricle (or, in a manner not shown, atria) depolarization period as the earliest beginning and the latest end of QRS (or, in a manner not shown, P) wave among the ECG signals; calculating the duration of the QRS (or P) wave; determination of the time period at the end of the atrial or ventricle depolarization (e.g. from 80% to 90% of the above duration) as the selected time frame for further processing.

Next (as shown at step 20 of the above FIG. 4), isopotential maps of the cardiac electrical activity are constructed for the selected processing period, based on the values of the electric potential determined via the above discussed non-invasive cardiac mapping technique.

Figure 6:
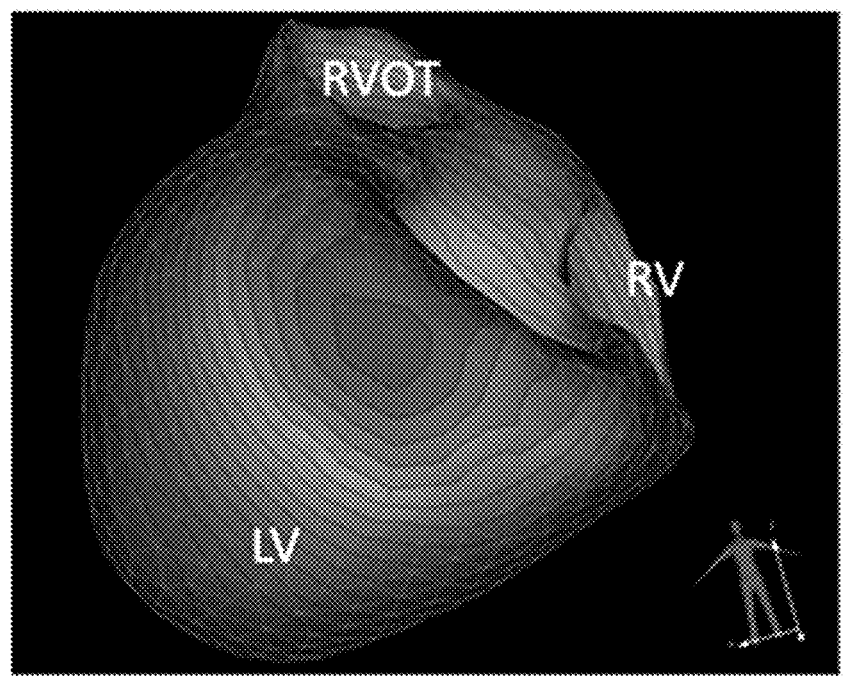
FIG. 6 shows a 3D model of the human heart ventricle in the form of a triangulated surface and isopotential maps in the form of piecewise linear interpolation.

According to a possible embodiment, as shown in FIG. 6, construction of the isopotential maps envisages triangulation of the surface of the 3D model of the human heart ventricles (atria) and constructing the isopotential maps in the form of piecewise linear interpolation. Various methods can be used to construct a triangulation mesh of the surface, including Delaunay's triangulation, or others; the mesh in FIG. 6 was created, by way of example, by means of the advanced front method.

Figure 7:
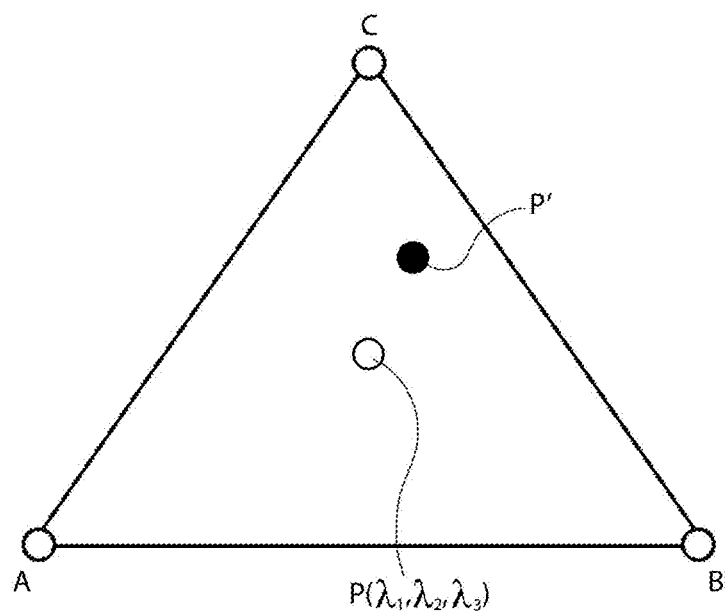
FIG. 7 is a schematic depiction of linear interpolation in a triangle.

Referring also to FIG. 7, assuming that the electrical potential values are given in each vertex of the mesh triangles, the interpolated value u(P') in an arbitrary point P' belonging to the enclosure of a triangle with vertices A, B, C is given by:

$$u(P')=\lambda_1 u(A)+\lambda_2 u(B)+\lambda_3 u(C),$$

where $(\lambda_1, \lambda_2, \lambda_3)$ are local barycentric coordinates of barycentre P of the triangle; and u(A), u(B) and u(C) are the electrical potential values at the vertices A, B and C of the same triangle.

The above barycentric coordinates $(\lambda_1, \lambda_2, \lambda_3)$ can be calculated starting from the 2D Cartesian coordinates (x,y) of point P and the 2D Cartesian coordinates $(x_A, y_A)$, $(x_B, y_B)$, $(x_C, y_C)$ of the triangle vertices A, B, C, given on the plane to which the triangle belongs:

$$\begin{pmatrix}\lambda_1\\\lambda_2\\\lambda_3\end{pmatrix}=\begin{pmatrix}1&1&1\\x_A&x_B&x_C\\y_A&y_B&y_C\end{pmatrix}^{-1}\cdot\begin{pmatrix}1\\x\\y\end{pmatrix}.$$

Next, as shown at step 22 in the above FIG. 4, follows the detection of positive potential zones on the cardiac surface (this then leading to the latest activation zone—LAZ—detection).

In particular, a single-connected area in which the potential values exceed a threshold is detected starting from the previously determined isopotential maps. According to a possible embodiment, a threshold equal to $1/12$ of the amplitude of the electric potential for the entire period of excitation of the ventricles (atria) is selected. In other words, the above zone is determined as a maximal potential area bounded by a closed isopotential contour, when using a map with 12 potential gradations.

For example, minimum and maximum values of the electrical potential on the isopotential maps within the depolarization period may be determined and the electrical potential amplitude for the entire period of excitation of the ventricles (atria) may be calculated as a difference between the determined maximum and minimum values.

Figure 8:
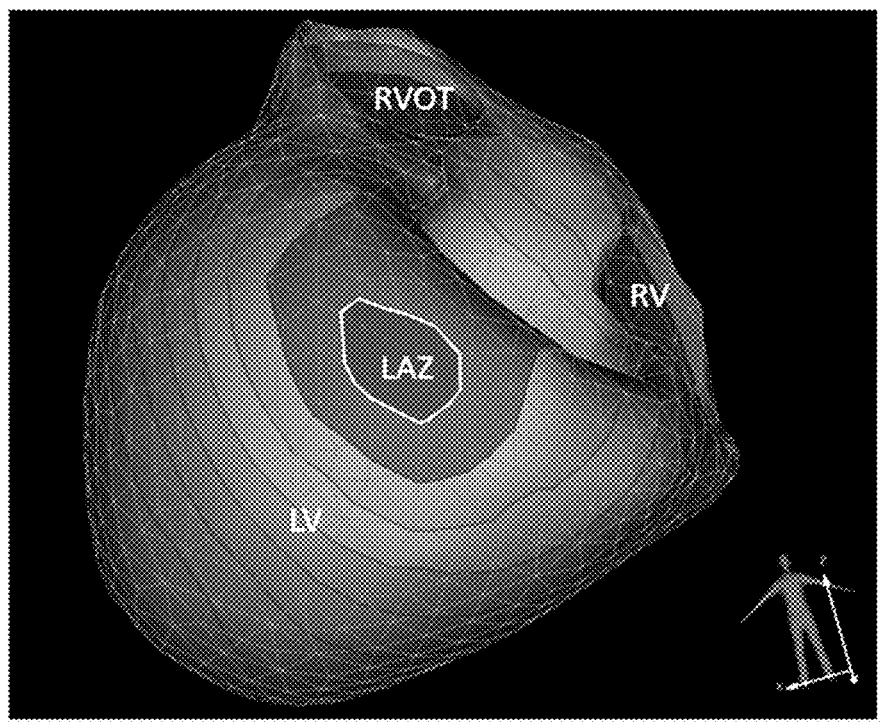
FIG. 8 shows the identification of a latest activation zone in the 3D model of FIG. 6.

The selected area represents the latest activation zone and is denoted as LAZ in FIG. 8, wherein LV denotes the left ventricle, RV the right ventricle and RVOT the right ventricle outflow tract.

Next, as shown at step 24 in the above FIG. 4, the geometric center (or barycenter) of the detected latest activation zone is determined.

In general, the barycenter C of a subset $X\subset\mathbb{R}^3$ of points can be computed by the integral:

$$C=\frac{\int xg(x)dX}{\int g(x)dX},$$

where g is the characteristic function of the subset, which is 1 inside the subset X and 0 outside it.

However, simpler methods can be used to determine the barycentre; as an example, one of the versions of the geometric decomposition approach can be used.

This approach is based on the fact that when constructing isopotential maps by piecewise linear interpolation on triangular meshes, the isolines are polygons.

Figure 9:
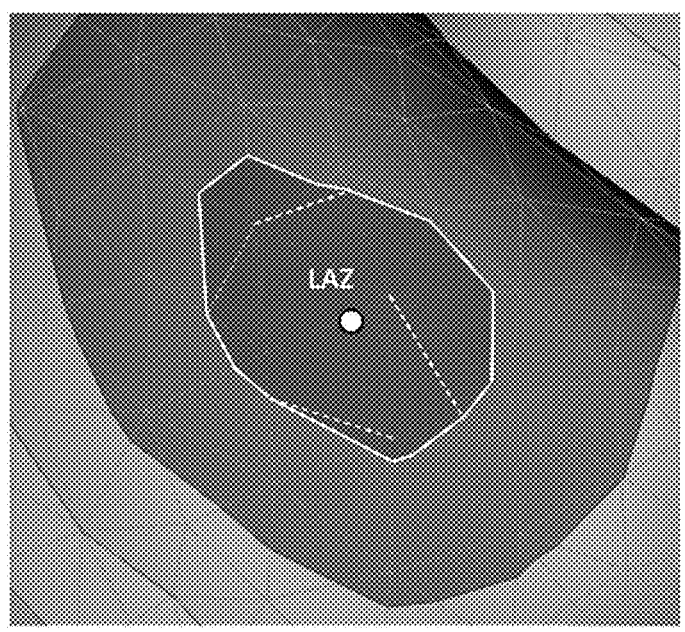
FIG. 9 shows the identification of the barycentre of the latest activation zone of FIG. 8.

As shown in the example of FIG. 9, the positive potential zone is therefore a polygon that includes triangles of the heart surface mesh, and possibly several quadrilaterals; each quadrilateral, if present, can be divided into two triangles.

For each triangle $t_i$, its barycenter $c(t_i)$ can be calculated by the expression:

$$c(t_i)=1/3\cdot(x_i^{(1)}+x_i^{(2)}+x_i^{(3)})$$

where $x_i^{(1)}$, $x_i^{(2)}$, $x_i^{(3)}$ are the vertices of triangle $t_i$.

Next, the barycenter C of the positive potential domain (i.e. of the latest activation zone) is calculated by the exnression:

$$C=\frac{\sum_{i=1}^{N}c(t_i)\cdot s(t_i)}{s(t_i)},$$

where N is the number of the triangles and $s(t_i)$ are their areas.

Figure 10:
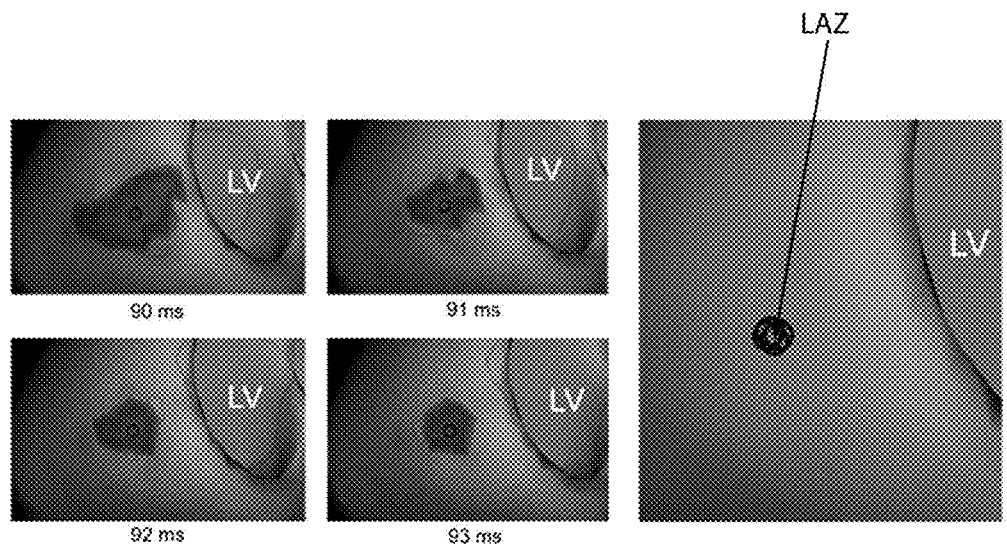
FIG. 10 shows a sequential series of isopotential maps, acquired at consecutive time periods and the corresponding latest activation zones.

As previously discussed and as shown in the example of FIG. 10, the use of a sequential series of the isopotential maps, acquired at consecutive times in the processing period, e.g. with a time step of 1 ms, allows for a more accurate detection of the latest activation site.

This approach consists in the detection of the central point $P(t_j)$ for each isopotential map created at the respective time $t_j$ within the considered time period (e.g. from 80% to 90% of the duration of the atrial or ventricle depolarization) and in the computation of the resulting latest activation point P as an average position of all the detected central points $P(t_j)$, as shown in step 26 of FIG. 4.

Assuming that the coordinates of the central points $P(t_j)$ have a normal distribution, the average position can be found as the mean point of impact, i.e., as a center of the confidence ellipse.

Figure 11:
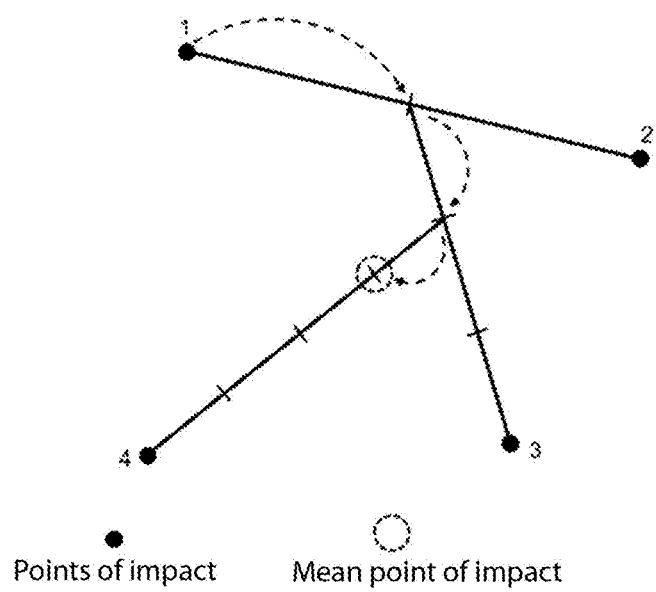
FIG. 11 is a schematic depiction of an iterative algorithm for identification of the average latest activation point.

According to a possible embodiment, the latest activation point P is computed using the following simple iterative algorithm, which is exemplified in the diagram of FIG. 11.

The central points $P(t_j)$, or points of impact, are numbered in an arbitrary order: $P^{(1)}, P^{(2)}, \ldots, P^{(N)}$ and the point $P^{(1)}$ is selected as the initial approximation $M^{(1)}:M^{(1)}=P^{(1)}$.

The point $M^{(k+1)}$ of any next approximation (k starting from 1 up to N−1) is then calculated as:

$$M^{k+1}=D_{k+1}(M^k,P^{k+1}),$$

wherein point $D_{k+1}$ is computed as follows: the point $M^k$ is connected to the point $P^{k+1}$ by a geodesic (straight) line; the geodesic line is divided in k+1 segments of equal length; the end of the segment closest to point $M^k$ is taken as the point $D_{k+1}$ (and thus as the next approximation $M^{k+1}$).

The last approximation $M^N$ that is thereby iteratively determined represents the mean point of impact, i.e. the position of the latest activation point P.

As shown at step 28 of the above FIG. 4, the method ends with the output of the result of the identification of the latest activation zone, e.g. for displaying on the display or monitor 3.

The advantages of the discussed solution will be clear from the foregoing description.

In any case, it is underlined again that the discussed solution provides for an efficient and accurate determination of the sites of latest cardiac electrical activation, which can be used, e.g., in order to determine the optimal position of the left ventricular pacing electrode for cardiac resynchronization therapy.

In particular, when the proposed solution is used to process non-invasive cardiac mapping data, it is more accurate than known approaches based on the determination of the local activation time as the intrinsic deflection time of local unipolar electrograms.

Clearly, changes may be made to what is described herein without, however, departing from the scope of protection as defined in the accompanying claims.

In particular, it is again underlined that the cardiac mapping, on which the solution is based, can be done both with invasive and non-invasive techniques, of any known type.

The invention claimed is:

1. A method for an automated detection of sites of latest electrical activation of a human heart, comprising:
   constructing a number of isopotential maps associated with an electrical potential distribution on a surface of the heart in respective times within a processing period occurring near an end of a ventricular or atrial depolarization;
   processing the isopotential maps to identify regions of maximal positive electrical potential;
   determining barycenters of the identified regions; and
   localizing a site of latest heart electrical activation based on the determined barycenters,
   wherein constructing the isopotential maps is performed in a period from 80% to 90% of a duration of a depolarization period.

2. The method according to claim 1, further comprising:
   measuring electrograms at a number of points on a surface of a torso with body surface electrodes (6), the electrograms being representative of values of an electric potential on the surface of the torso;
   implementing a numerical reconstruction of a distribution of electrical potential on the surface of the heart, based on the values of the electric potential measured on the surface of the torso, in combination with a geometrical 3D model of the heart and/or torso of the patient.

3. The method according to claim 2, further comprising generating the geometrical model of the heart and/or torso of the patient based on heart and/or torso geometry coordinates obtained by means of an imaging device (8).

4. The method according to claim 3, wherein the imaging device (8) is a CT—Computer Tomography—or a MRI—Magnetic Resonance Imaging—device.

5. The method according to claim 2, wherein constructing the isopotential maps includes performing a triangulation of the surface of the geometrical 3D model of the heart ventricles or atria and constructing the isopotential maps in the form of piecewise linear interpolation.

6. The method according to claim 2, wherein implementing the numerical reconstruction of the distribution of electrical potential on the surface of the heart is based on a numerical solution of the inverse electrocardiogram in terms of potentials.

7. The method according to claim 1, wherein identifying regions of maximal positive electrical potential comprises determining, in the isopotential maps, areas in which the electrical potential values exceed a threshold.

8. The method according to claim 1, comprising computing the site of latest heart electrical activation as an average position of the barycenters of the regions of maximal positive electrical potential identified in said isopotential maps.

9. The method according to claim 8, comprising computing the site of latest heart electrical activation as a mean point of impact of said barycenters.

10. The method according to claim 1, comprising:
    acquiring ECG signals from ECG leads (7) placed on the torso; and
    determining the processing period based on the acquired ECG signals.

11. The method according to claim 10, wherein determining the processing period comprises: determining the beginning and end of the ventricle or atria depolarization period as the earliest beginning and the latest end of QRS, or respectively P, wave among the ECG signals; calculating the duration of the QRS, or respectively P, wave; determining the processing period as a period from 80% to 90% of said duration.

12. A system (1) for the automated detection of sites of latest electrical activation of the human heart, comprising a processing unit (2) configured to implement the method according to claim 1.

13. The system according to claim 12, further comprising a number of body surface electrodes (6) on the surface of the torso for measuring corresponding electrograms representative of the values of the electric potential on the surface of the torso.

14. The system according to claim 12, further comprising ECG leads (7) placed on the torso for acquiring corresponding ECG signals.

15. The system according to claim 12, further comprising an imaging device (8) configured to obtain heart and/or torso geometry coordinates.

16. The method according to claim 1, wherein the determining of the barycenters of the identified regions comprises computing the barycenter C of a subset $X \subset \mathbb{R}^3$ of points of the identified regions by the integral:

$$C = \int x g(x) dX / \int g(x) dX,$$

where g is a characteristic function of the subset, which is 1 inside the subset X and 0 outside the subset X.

* * * * *